March 19, 1968 R. KROMREY 3,374,376
ELECTRIC GENERATOR
Filed Jan. 9, 1964 5 Sheets-Sheet 1

RAYMOND KROMREY
INVENTOR.

BY

*Karl G. Ross*

AGENT

March 19, 1968  R. KROMREY  3,374,376
ELECTRIC GENERATOR
Filed Jan. 9, 1964  5 Sheets-Sheet 2

INVENTOR.
RAYMOND KROMREY
BY
Karl G. Ress
AGENT

March 19, 1968    R. KROMREY    3,374,376
ELECTRIC GENERATOR
Filed Jan. 9, 1964    5 Sheets-Sheet 3

RAYMOND KROMREY
INVENTOR.

BY

Karl G. Ross
AGENT

March 19, 1968  R. KROMREY  3,374,376
ELECTRIC GENERATOR

Filed Jan. 9, 1964

RAYMOND KROMREY
INVENTOR.

BY

AGENT

United States Patent Office 3,374,376
Patented Mar. 19, 1968

3,374,376
ELECTRIC GENERATOR
Raymond Kromrey, 15 Rue du Mt. Blanc,
Geneva, Switzerland
Filed Jan. 9, 1964, Ser. No. 336,769
1 Claim. (Cl. 310—112)

My present invention relates to an electric generator serving to convert magnetic force into electric energy with the aid of two relatively rotatable members, i.e. a stator and a rotor, one of these members being provided with electromagnetic or permanent-magnetic means adapted to induce a voltage in a winding forming part of an output circuit on the other member.

Conventional generators of this type utilize a winding whose conductors form loops in different axial planes whereby, upon relative rotation of the two members, diametrically opposite portions of each loop pass twice per revolution through the field of each pole pair of the magnetic inductor member (usually the stator). If the loops are open-circuited, no current flows in the winding and no reaction torque is developed so that the rotor will be free to turn at the maximum speed of its driving unit. As soon as the output circuit including the winding is short-circuited or connected across a load, the resulting current flow tends to retard the motion of the rotor to an extent dependent upon the magnitude of the current, it being therefore necessary to provide compensating speed-regulating devices if it is desired to maintain a substantially constant terminal voltage. Moreover, the variable reaction torque subjects the rotor and its transmission to considerable mechanical stresses which, in the case of widely fluctuating load currents, may lead to objectionable strains.

It is, therefore, the general object of my present and new invention to provide an electric generator which obviates the aforedescribed disadvantages.

A more particular object of my invention is to provide a generator of such construction that its reaction torque and, therefore, its rotor speed in response to a given driving torque varies but little upon changeover from open circuit to current delivery or vice versa.

It is also an object of this invention to provide an electric generator whose terminal voltage varies at a considerably lesser rate than its rotor speed so as to be less affected than conventional generators by fluctuations of its driving rate.

I have found, in accordance with this invention, that the foregoing objects can be realized by the relative rotation of an elongated ferromagnetic element, such as a bar-shaped soft-iron armature, and a pair of pole pieces defining an air gap wherein a magnetic field is set up under the influence of a suitable source of coercive force. The armature carries a winding, advantageously in the form of two series-connected coils embracing opposite extremities thereof, which is included in an output circuit adapted to be connected to a load. As the armature rotates within the stationary air gap (or, conversely, the pole pieces swing about the stationary armature), the magnetic circuit is intermittently completed and the armature experiences periodic remagnetizations with successive reversals of polarity.

When the output circuit is open, the mechanical energy applied to the driven rotor member is converted, to the extent that it is not needed to overcome frictional resistance, into work of magnetization which in turn is dissipated as heat; in actual practice, however, the resultant rise in the temperature of the armature will be hardly noticeable, particularly if the armature is part of the continuously air-cooled rotor assembly. When the output circuit is closed, part of this work is translated into electrical energy as the current flow through the winding opposes the magnetizing action of the field and increases the apparent magnetic reluctance of the armature. This explains why, in a system embodying my invention, the speed of the generator remains substantially unchanged when the output circuit is either opened or closed.

As the armature approaches its position of alignment with the gap, the constant magnetic field existing thereacross tends to accelerate the rotation of the armature relative to the pole pieces, thereby aiding the applied driving torque; the opposite action, i.e. a retarding effect, occurs after the armature passes through its aligned position. As the rotor attains a certain speed, however, the flywheel effect of its mass overcomes these fluctuations in the total applied torque so that a smooth rotation ensues.

In a practical embodiment, according to a more specific feature of my invention, the magnetic-flux path includes two axially spaced magnetic fields traversing the rotor axis substantially at right angles, these fields being generated by respective pole pairs co-operating with two axially spaced armatures of the character described. It will generally be convenient to arrange the two armatures in a common axial plane, the two field-producing pole pairs being similarly coplanar. The armatures are preferably of the laminated type to minimize the flow of eddy currents therein; thus, they may consist in essence of highly permeable (e.g. soft-iron) foils whose principal dimension is perpendicular to the rotor axis, the foils being held together by rivets or other suitable fastening means.

If the ferromagnetic elements are part of the rotor, the output circuit will include the usual current-collecting means, such as slip rings or commutator segments, according to whether alternating or direct current is desired. The source of coercive force in the stator includes, advantageously, a pair of oppositely disposed yoke-shaped magnets, of the permanent or the electrically energized type, whose extremities constitute the aforementioned pole pieces. If electromagnets are used in the magnetic circuit, they may be energized by an external source or by direct current from the output circuit of the generator itself.

I have found that the terminal voltage of the output circuit of a generator according to the invention does not vary proportionately to the rotor speed, as might be expected, but drops at a considerably slower rate with decreasing speed of rotation; thus, in a particular unit tested, this voltage fell only to about half its original value upon a cutting of the rotor speed to one-third. This nonlinear relationship between terminal voltage and driving rate enables the maintenance of a substantially constant load current and, therefore, electric output over a wide speed range, at least under certain load conditions, inasmuch as the inductive reactance of the winding is proportional to frequency (and consequently to rotor speed) so as to drop off more rapidly than the terminal voltage, in the event of a speed reduction, with a resulting improvement in the power factor of the load circuit.

If the magnetic circuit includes but a single pole pair per air gap, the flux induced in the relatively rotating armature will change its direction twice per revolution so that each revolution produces one complete cycle of 360 electrical degrees. In general, the number of electrical degrees per revolution will equal 360 times the number of pole pairs, it being apparent that this number ought to be odd since with even numbers it would not be possible to have poles alternating in polarity along the path of the armature and also to have the north and south poles of each pair at diametrically opposite locations. In any case it is important to dimension the confronting arcuate faces of the pole pairs in such manner as to avoid bridging of adjoining poles by the armature, hence it behooves to make the sum of the arcs spanned by these faces (in the plane of rotation) equal to considerably less than 360° electrical.

The invention will be described hereinafter with greater detail, reference being made to the accompanying drawing in which.

Figures 4, 5:
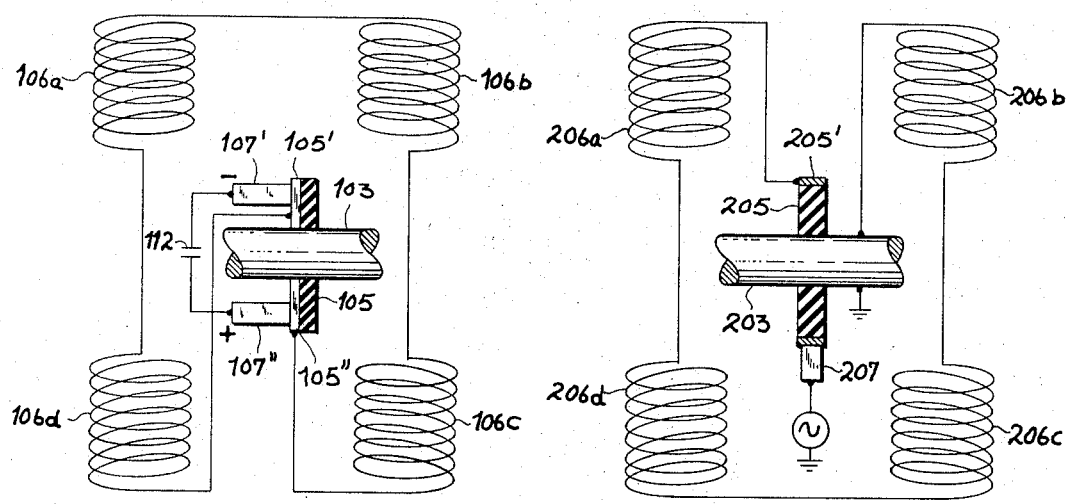
Figure 6:
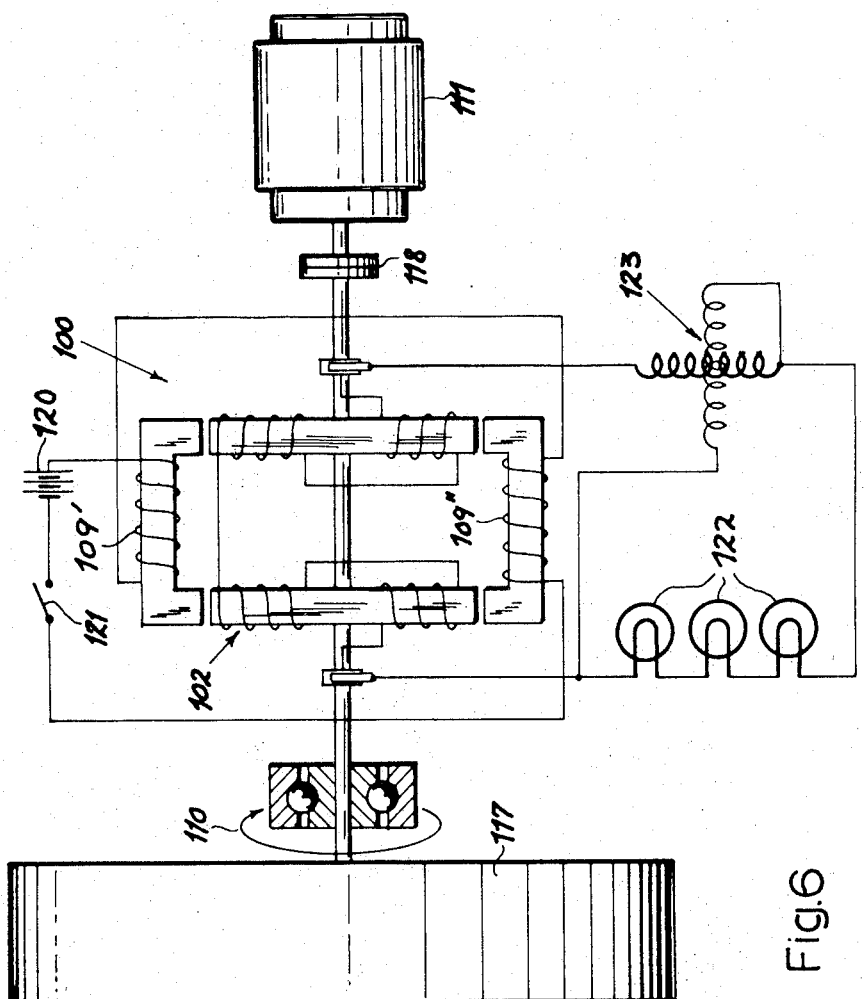
Figure 6:
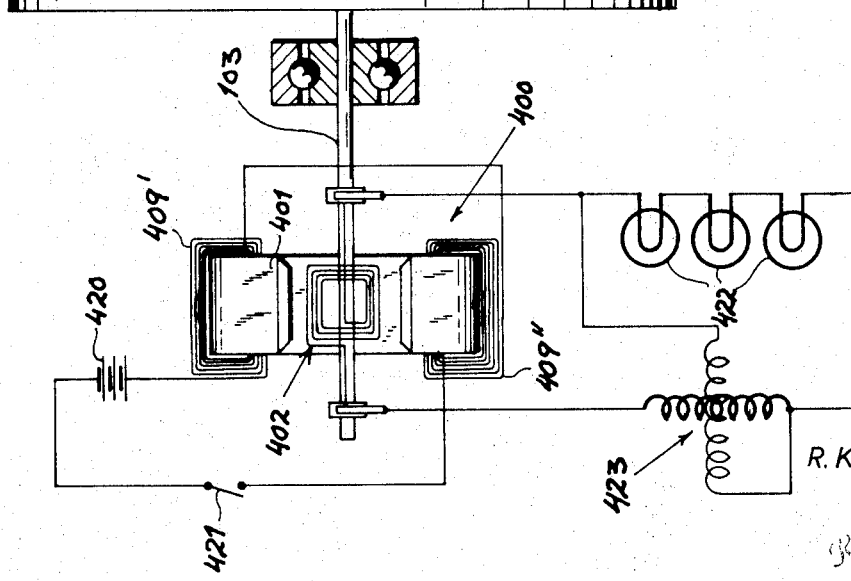

FIGS. 4 and 5 diagrammatically illustrate two output circuits for a generator according to the invention, designed respectively for direct and alternating current; and FIG. 6 is a somewhat diagrammatic illustration of an arrangement for comparing the outputs of a conventional generator and a generator according to the invention.

Figure 1:
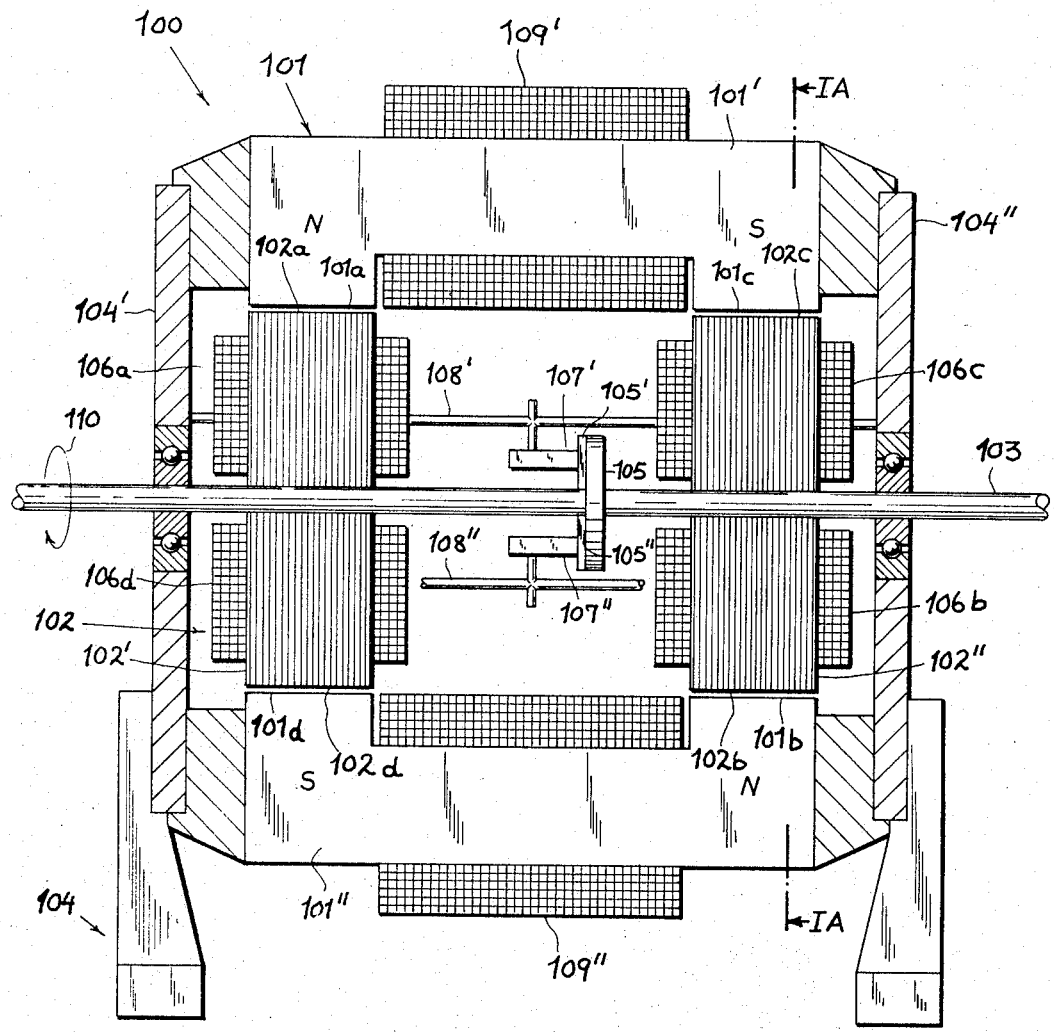
FIGS. 1 and 1A illustrate a first embodiment of my invention in axial section and in a cross-sectional view taken on line IA—IA of FIG. 1, respectively.
Figure 1A:
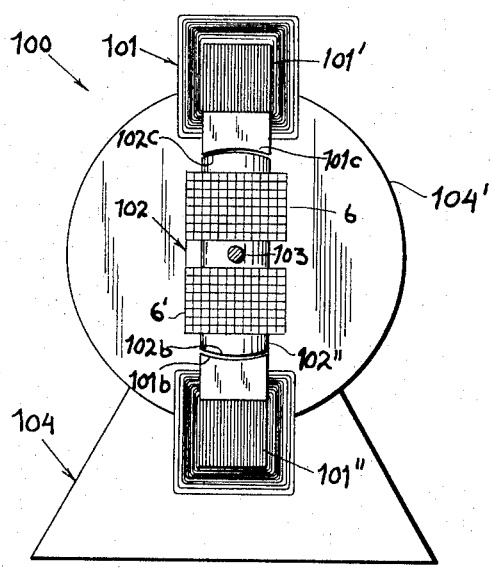

The generator 100 shown in FIGS. 1 and 1A comprises a stator member 101 and a rotor member 102, the latter comprising a pair of laminated armatures 102', 102" carried on a shaft 103 which is rotatably journaled in end plates 104', 104" of a generator housing 104 of nonmagnetic material (e.g. aluminum) rigid with the stator. Shaft 103 is coupled with a source of driving power indicated diagrammatically by an arrow 110.

The stator 101 includes a pair of yoke-shaped laminated electromagnets 101', 101" whose extremities form two pairs of coplanar pole pieces respectively designated 101a, 101b (north) and 101c, 101d (south). The pole pieces have concave faces confronting complementarily convex faces 102a, 102d of armature 102' and 102b, 102c of armature 102". These faces, whose concavities are all centered on the axis of shaft 103, extend over arcs of approximately 20 to 25° each in the plane of rotation (FIG. 1A) so that the sum of these arcs adds up to about 90° geometrical and electrical.

The magnets 101', 101" of the stator are surrounded by respective energizing windings 109', 109" which are connected across a suitable source of constant direct current, not shown. Similar windings, each composed of two series-connected coils 106a, 106d and 106b, 106c, surround the rotor armatures 102' and 102", respectively. These coils form part of an output circuit which further includes a pair of brushes 107', 107" that are carried by arms 108', 108" on housing 104 with mutual insulation; brushes 107', 107" co-operate with a pair of commutator segments 105', 105" (see also FIG. 4) which are supported by a disk 105 of insulating material on shaft 103. By virtue of the series connection of coils 106a–106d between the segments 105' and 105", as illustrated in FIG. 4, the alternating voltage induced in these coils gives rise to a rectified output voltage at brushes 107' and 107"; the unidirectional current delivered by these brushes to a load (not shown) may be smoothed, in a manner known per se, by conventional filter means represented diagrammatically by a condenser 112 in FIG. 4.

Figure 2:
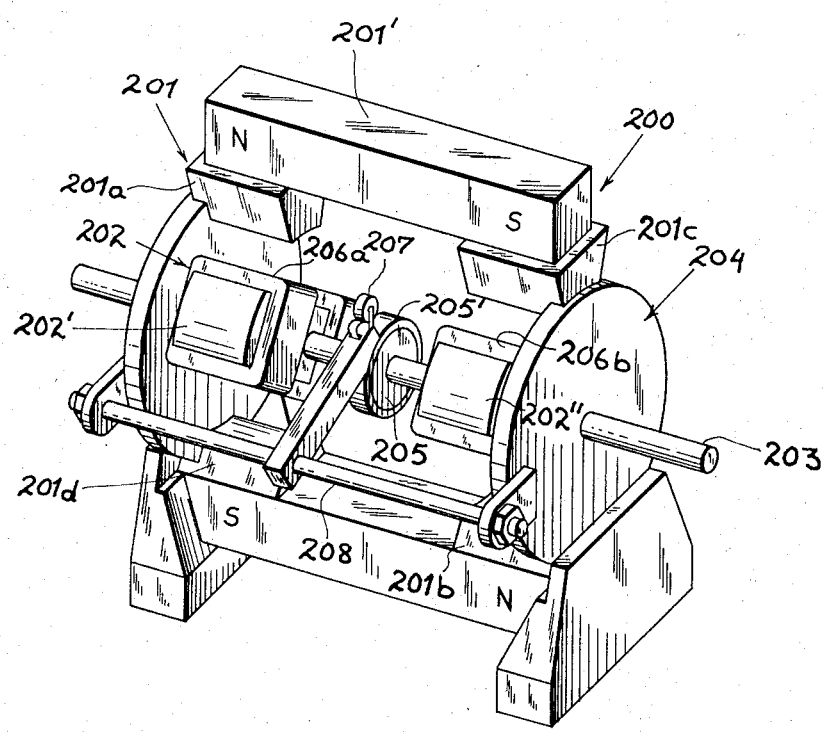
FIGS. 2 and 3 are perspective views illustrating two further embodiments.

In FIG. 2 I have shown a modified generator 200 whose housing 204 supports a stator 201 consisting essentially of two permanent bar magnets 201' and 201" extending parallel to the drive shaft 203 on opposite sides thereof, each of these magnets being rigid with a respective pair of pole shoes 201a, 201c and 201b, 201d. Rotor 202 comprises a pair of laminated armatures 202', 202", similar to those of the preceding embodiment, whose output coils 206a, 206b, 206c, 206d are serially connected between a slip ring 205', supported on shaft 203 through the intermediary of an insulating disk 205, and another terminal here represented by the grounded shaft 203 itself. Slip ring 205' is contacted by a brush 207 on a holder 208, the output of this brush being an alternating current of a frequency determined by the rotor speed.

Figure 3:
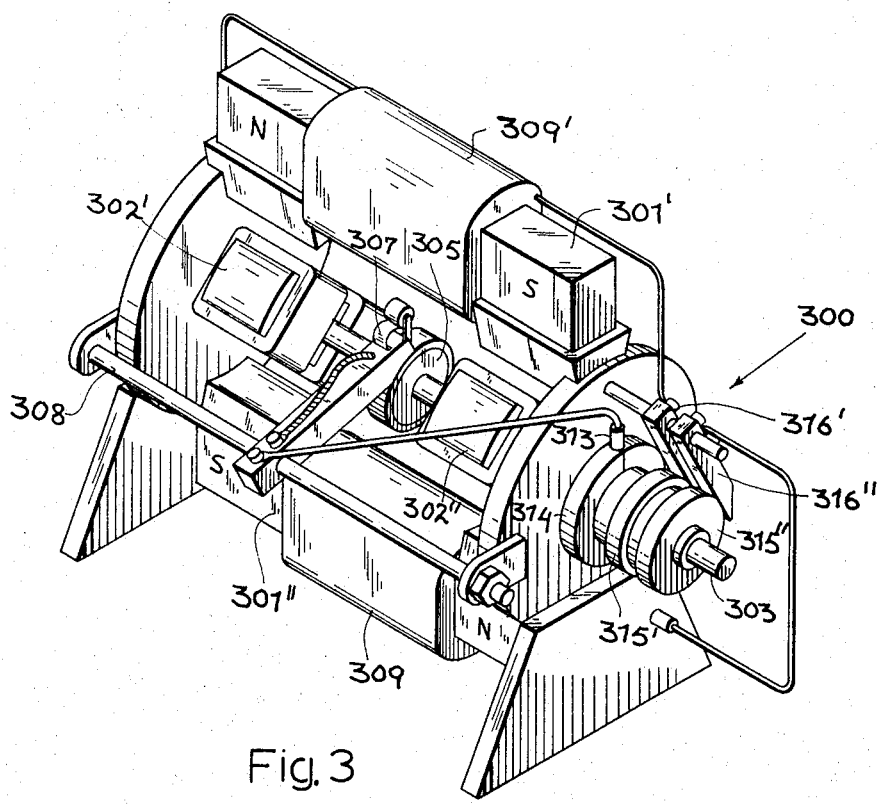

In FIG. 3 I have shown a generator 300 basically similar to generator 100 of FIGS. 1 and 1A, its shaft 303 carrying a pair of laminated soft-iron armatures 302', 302" rotatable in the air gaps of a pair of electromagnets 301', 301" bearing energizing windings 309' and 309". The commutator 305 again co-operates with a pair of brushes of which only one, designated 307, is visible in the figure. This brush, carried on an arm 308, is electrically connected to a brush 313 engaging a slip ring 314 on an extremity of shaft 303 which also carries two further slip rings 315', 315" in conductive contact with ring 314 but insulated from the shaft. Two further brushes 316', 316" contact the rings 315', 315" and are respectively connected to windings 309' and 309", respectively, the other ends of these windings being connected to an analogous system of brushes and slip rings on the opposite shaft extremity whereby the two commutator brushes are effectively bridged across the windings 309' and 309" in parallel. In this embodiment, therefore, the stator magnets are energized from the generator output itself, it being understood that the magnets 301' and 301" (made, for example, of steel rather than soft iron) will have a residual coercive force sufficient to induce an intial output voltage as is known per se. Naturally, the circuits leading from the brushes 307 to the windings 309', 309" may include filter means as described in connection with FIG. 4.

In FIG. 6 I have shown a test circuit designed to compare the outputs of a generator according to the invention, such as the unit 100 of FIGS. 1 and 1A, with a conventional generator 400 of the type having a looped armature 402 rotatable in a gap of a stator magnet 401 with energizing winding 409', 409". The two generators are interconnected by a common shaft 103 carrying a flywheel 117, this shaft being coupled via a clutch 118 to a drive motor 111 whereby the rotors 402 and 102 of both generators are rotatable in unison as indicated by arrow 110. Two batteries 120 and 420, in series with switches 121 and 421, are representative of means for supplying direct current to the stator windings 109', 109" and 409', 409" of the two generators.

The rectified output of generator 100 is delivered to a load 122, here shown as three series-connected incandescent lamps with a combined consumption of 500 watts, generator 400 working into an identical load 422. Two wattmeters 123 and 423 have their voltage and current windings respectively connected in shunt and in series with the associated loads 122 and 422 to measure the electric power delivered by each generator.

Upon engagement of the clutch 118, shaft 103 with its flywheel 117 is brought to an initial driving speed of 1200 r.p.m. whereupon the switch 421 in the energizing circuit of conventional generator 400 is closed. The lamps 422 light immediately and the corresponding wattmeter 423 shows an initial output of 500 watts; this output, however, drops instantly as the flywheel 117 is decelerated by the braking effect of the magnetic field upon armature 402.

Next, the procedure is repeated but with switch 421 open and switch 121 closed to energize the generator 100. The lamps 122 light up and the wattmeter 123 shows an output of 500 watts which remains constant for an indefinite period, there being no appreciable deceleration of flywheel 117. When the clutch 118 is released and the rotor speed gradually decreases, the output of generator 100 is still substantially 500 watts at a speed of 900 r.p.m. and remains as high as 360 watts when the speed drops further to 600 r.p.m.

In a similar test with a generator of the permanent-magnet type, such as the one shown at 200 in FIG. 2, a substantially constant output was observed over a range of 1600 to 640 r.p.m.

Modifications of the specific arrangements described and illustrated will, of course, be apparent to persons skilled in the art and are deemed to be embraced in the spirit and scope of my invention as defined in the appended claim.

I claim:
1. An electric generator comprising a fixed stator and a rotor coaxial with said stator; drive means for rotating said rotor about its axis, said stator being provided with a pair of elongated bar magnets extending parallel to said axis on opposite sides thereof and terminating in transverse extremities, oppositely poled extremities of said magnets confronting each other and defining magnet means having two axially spaced pole pairs disposed in a common axial plane and forming a pair of diametrically extending air gaps for establishing a magnetic-flux path including two axially spaced parallel magnetic fields across said air gaps traversing said axis substantially at right angles, said rotor being provided with two axially spaced parallel elongated ferromagnetic elements slightly shorter than the spacing of said confronting extremities and extending perpendicularly to said axis at locations coplanar with said pole pairs for concurrent periodic alignment of said elements with said fields in said air gaps upon rotation of said rotor; and an output circuit on said rotor including winding means on each of said elements and collector means in series with said winding means, each of said pole pairs and the corresponding elements having confronting arcuate faces centered on said axis, the sum of the arcs spanned by said faces being substantially equal to 90° in the plane of rotation.

References Cited

UNITED STATES PATENTS

| | | | |
|---|---|---|---|
| 439,102 | 10/1890 | Bradley | 310—126 XR |
| 2,500,730 | 3/1950 | Yonkers | 310—168 |
| 2,769,106 | 10/1956 | Dembowski | 310—168 |
| 3,173,042 | 3/1965 | Foder | 310—114 |
| 3,175,111 | 3/1965 | Orr | 310—126 |
| 3,205,384 | 9/1965 | Sears | 310—112 |
| 2,378,668 | 6/1945 | Vickers | 310—46 |
| 2,669,687 | 2/1954 | Tastes | 310—46 |
| 2,824,272 | 2/1958 | Delaporte | 310—46 |
| 3,025,445 | 3/1962 | Welch | 310—49 |

FOREIGN PATENTS

| | | |
|---|---|---|
| 553,398 | 3/1923 | France. |
| 838,012 | 2/1939 | France. |
| 474,918 | 11/1937 | Great Britain. |

MILTON O. HIRSHFIELD, *Primary Examiner.*

J. W. GIBBS, D. G. DUGGAN, *Assistant Examiners.*